(12) United States Patent
Milligan et al.

(10) Patent No.: US 10,018,068 B2
(45) Date of Patent: Jul. 10, 2018

(54) BLADE OUTER AIR SEAL WITH COOLING HOLES

(71) Applicant: UNITED TECHNOLOGIES CORPORATION, Farmington, CT (US)

(72) Inventors: Peter J. Milligan, Kennebunk, ME (US); Paul M. Lutjen, Kennebunkport, ME (US); Ken F. Blaney, Middleton, NH (US); Thurman C. Dabbs, Dover, NH (US); Kevin J. Ryan, Alfred, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 652 days.

(21) Appl. No.: 14/596,152

(22) Filed: Jan. 13, 2015

(65) Prior Publication Data

US 2016/0201467 A1    Jul. 14, 2016

(51) Int. Cl.
*F01D 11/24* (2006.01)

(52) U.S. Cl.
CPC .......... *F01D 11/24* (2013.01); *F05D 2240/11* (2013.01); *F05D 2250/74* (2013.01); *Y02T 50/673* (2013.01)

(58) Field of Classification Search
CPC .... F01D 11/24; Y02T 50/673; F05D 2250/74; F05D 2250/11
See application file for complete search history.

(56) References Cited

U.S. PATENT DOCUMENTS

| | | | | |
|---|---|---|---|---|
| 6,340,285 B1* | 1/2002 | Gonyou | ............... | F01D 11/005 415/116 |
| 6,354,795 B1* | 3/2002 | White | ................... | F01D 11/24 415/116 |
| 7,147,432 B2* | 12/2006 | Lowe | ...................... | F01D 9/04 165/908 |
| 8,714,918 B2* | 5/2014 | Tibbott | ................ | F01D 11/08 415/173.1 |
| 8,998,572 B2* | 4/2015 | Lutjen | ................. | F04D 29/164 415/173.1 |
| 2010/0232929 A1* | 9/2010 | Joe | ........................ | F01D 9/04 415/1 |

* cited by examiner

*Primary Examiner* — Woody Lee, Jr.
*Assistant Examiner* — Adam W Brown
(74) *Attorney, Agent, or Firm* — Cantor Colburn LLP

(57) ABSTRACT

A blade outer air seal (BOAS) for a turbomachine can include a BOAS body including a plurality of cooling holes defined in substantial conformance with a set of Cartesian coordinates as set forth in Table 1 herein, wherein the Cartesian coordinates are provided with respect to a point P which is at the center of an arc W and co-planer with a machined surface V. A blade outer air seal (BOAS) for a turbomachine can include a BOAS body including a plurality of cooling holes defined in substantial conformance with a set of Cartesian coordinates as set forth in Table 2 herein, wherein the Cartesian coordinates are provided with respect to a point P' which is at the center of an arc W' and co-planer with a machined surface V'.

8 Claims, 3 Drawing Sheets

BLADE OUTER AIR SEAL WITH COOLING HOLES

BACKGROUND

1. Field

The present disclosure relates to blade outer air seals (BOAS), more specifically to turbine BOAS with cooling holes defined therein.

2. Description of Related Art

Blade outer air seals (BOAS) can be disposed in turbine sections of turbomachines for sealing the gap between a turbine blade tip and the inner wall of the turbomachine casing. In such uses, the BOAS can be exposed to extreme heat and can require cooling.

Such conventional methods and systems have generally been considered satisfactory for their intended purpose. However, there is still a need in the art for improved BOAS configurations for regulating the BOAS temperature. The present disclosure provides a solution for this need.

SUMMARY

A blade outer air seal (BOAS) for a turbomachine includes a BOAS body including a plurality of cooling holes defined in substantial conformance with a set of Cartesian coordinates as set forth in Table 1 herein, wherein the Cartesian coordinates are provided with respect to a point P which is at the center of an arc W and co-planer with a machined surface V, wherein a coordinate Z originates at point P and bisects arc W, wherein a coordinate Y is perpendicular to surface V, and wherein a coordinate X is orthogonal to Y and Z. The arc W can include a radius ranging from about 10.16 inches (258.06 millimeters) to about 10.18 inches (258.57 millimeters).

In certain embodiments, a blade outer air seal (BOAS) for a turbomachine includes a BOAS body including a plurality of cooling holes defined in substantial conformance with a set of Cartesian coordinates as set forth in Table 2 herein, wherein the Cartesian coordinates are provided with respect to a point P' which is at the center of an arc W' and co-planer with a machined surface V', wherein a coordinate Z' originates at point P' and bisects arc W', wherein a coordinate X' is perpendicular to surface V', and wherein a coordinate Y' is orthogonal to X' and Z'. The arc W' can include a radius ranging from about 10.25 inches (260.35 millimeters) to about 10.27 inches (260.86 millimeters).

A turbomachine can include a turbine section including a plurality of blade outer air seals (BOAS) disposed therein, the BOAS including a BOAS body including a plurality of cooling holes defined in substantial conformance with a set of Cartesian coordinates as set forth in Table 1 and/or Table 2, wherein the Cartesian coordinates are provided with respect to a point P' which is at the center of an arc W' and co-planer with a machined surface V'.

The turbine section can include at least one BOAS having cooling holes defined in at accordance with Table 1, and at least one BOAS having cooling holes defined in at accordance with Table 2. In certain embodiments, the at least one BOAS having cooling holes defined in at accordance with Table 1 can be disposed in a first stage of the turbine section. The at least one BOAS having cooling holes defined in at accordance with Table 2 can be disposed in a second stage of the turbine section aft of the first stage. These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
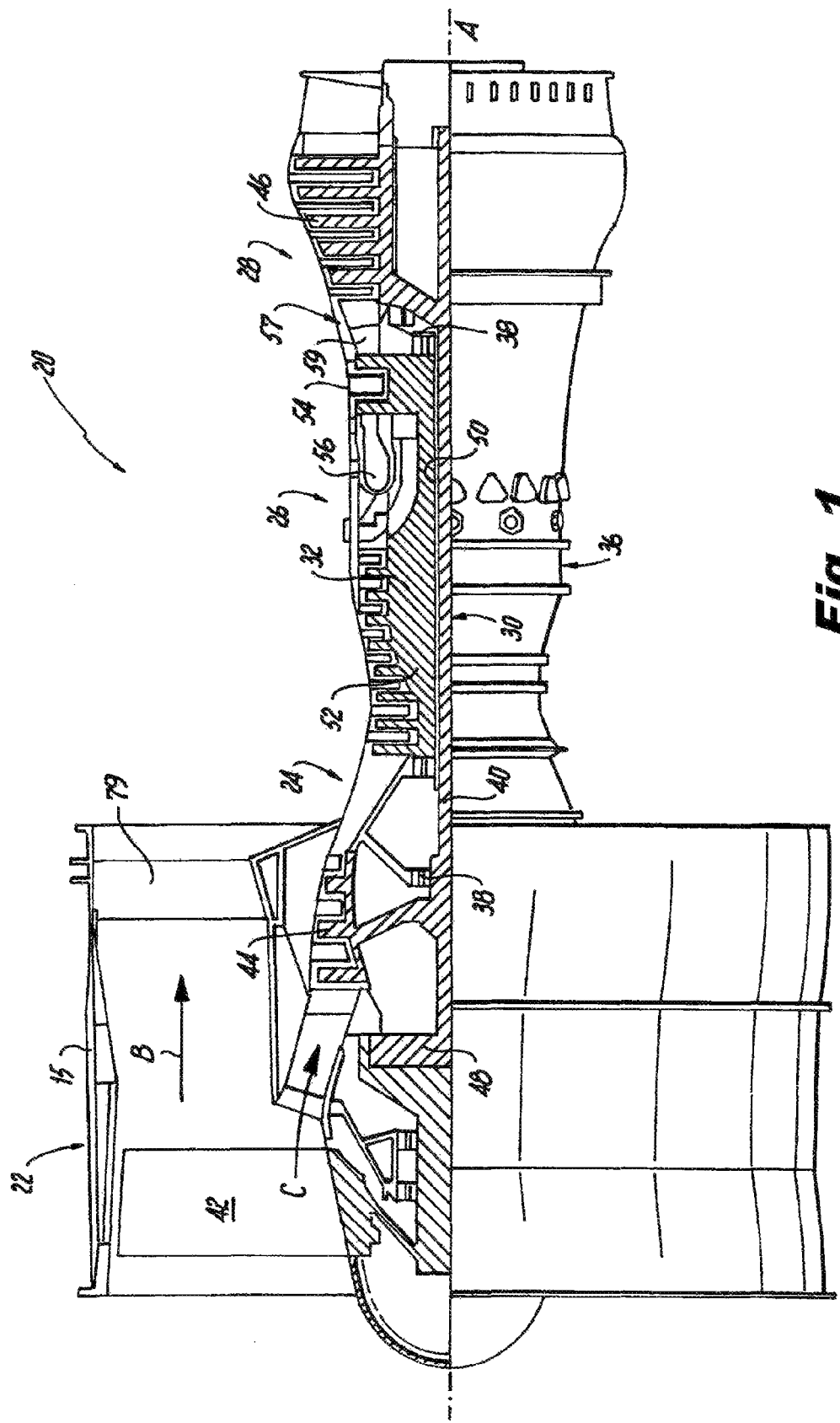
FIG. 1 is a schematic, partial cross-sectional view of a turbomachine in accordance with this disclosure.
Figure 2:
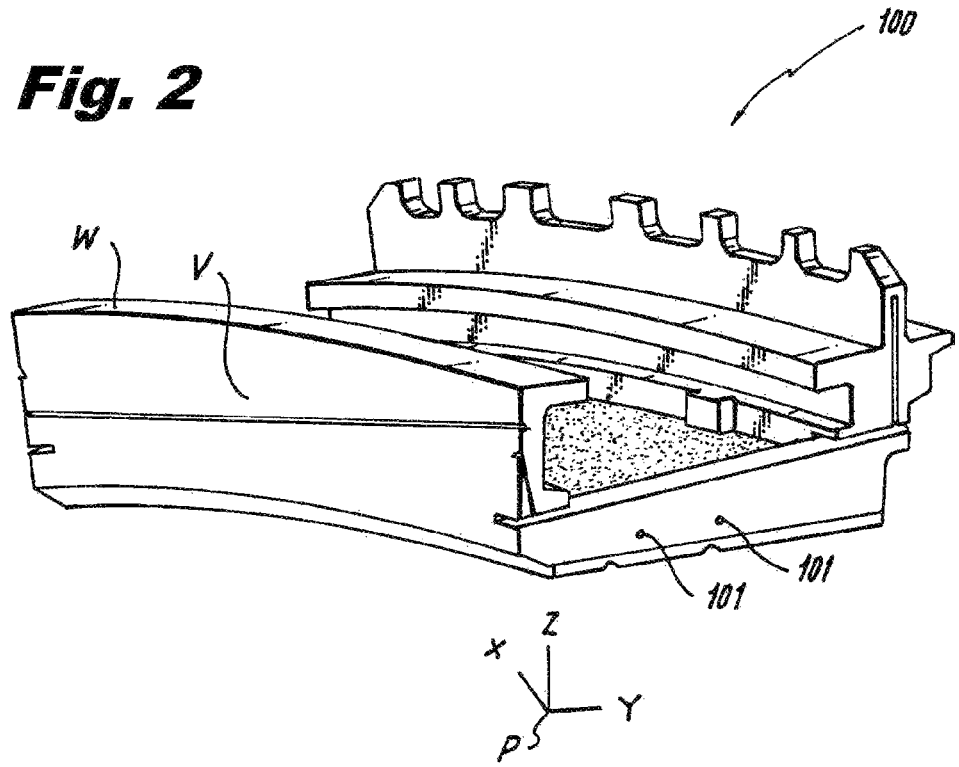
FIG. 2 is a perspective view of an embodiment of a blade outer air seal (BOAS) in accordance with this disclosure, showing cooling holes disposed therein.
Figure 3:
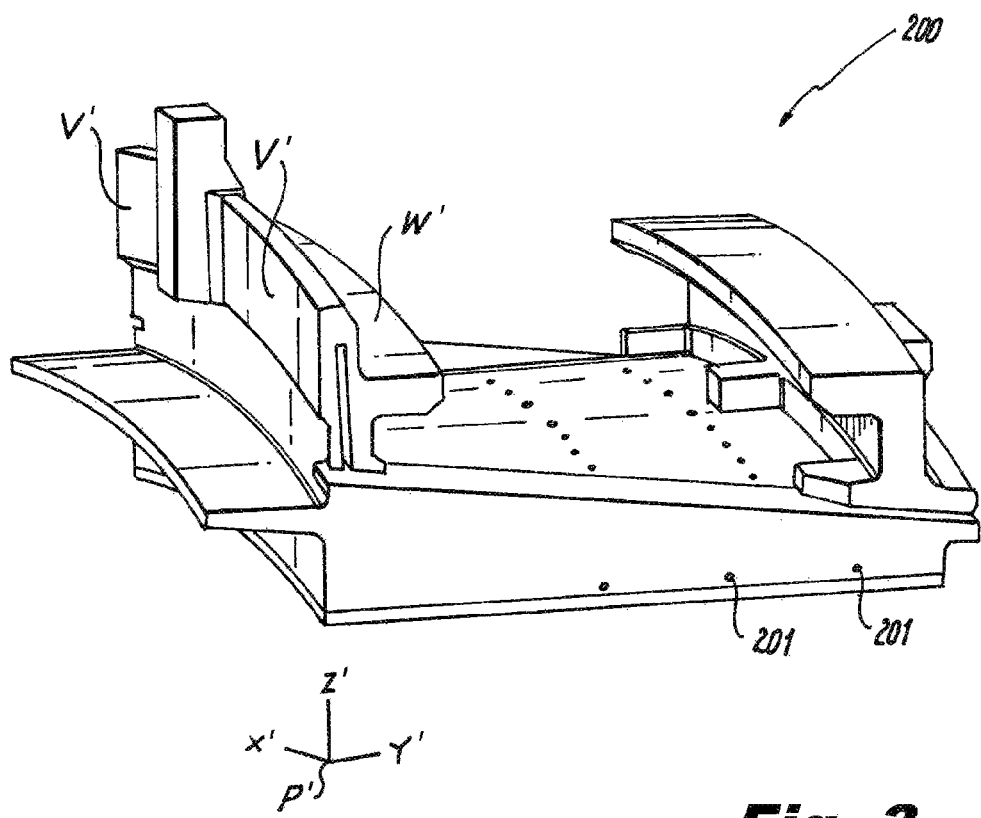
FIG. 3 is a perspective view of an embodiment of a blade outer air seal (BOAS) in accordance with this disclosure, showing cooling holes disposed therein.
Figure 4:
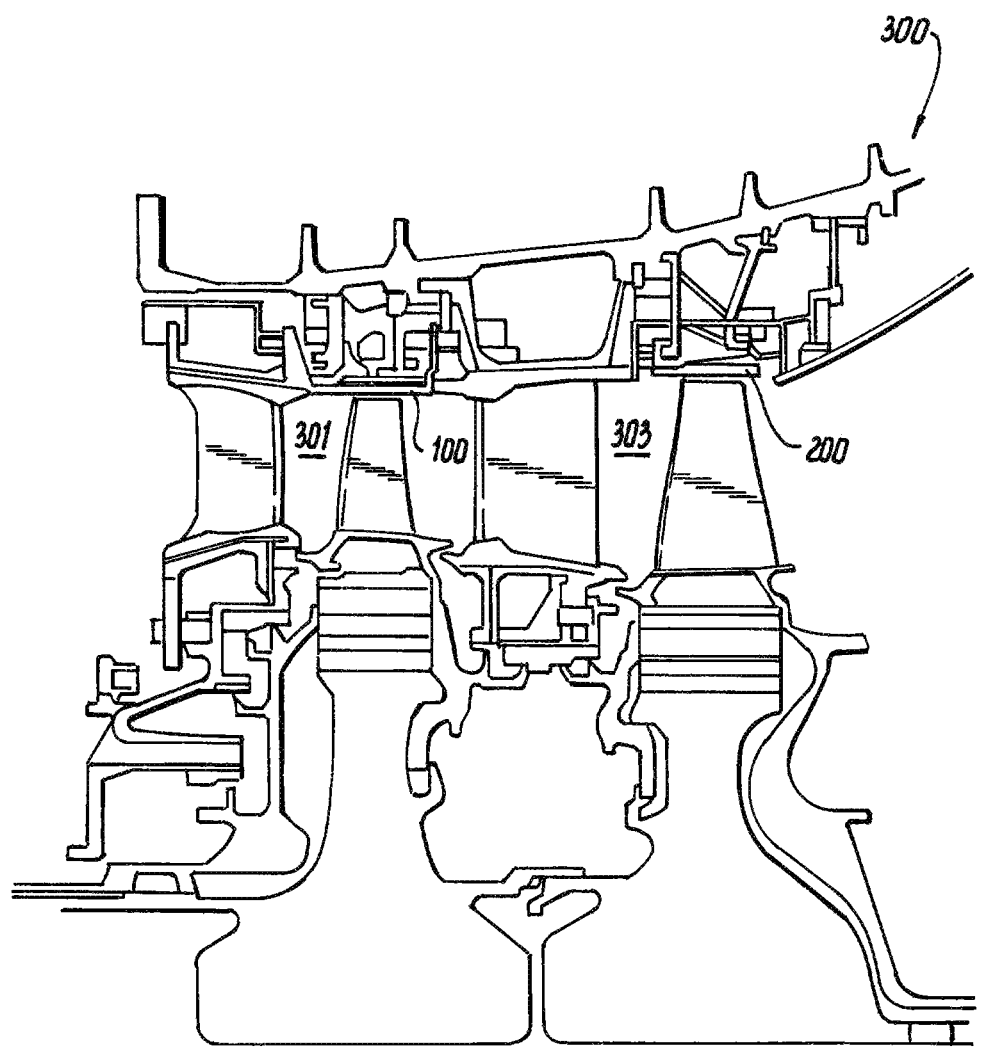
FIG. 4 is a cross-sectional view a turbomachine turbine section in accordance with this disclosure, showing a plurality of BOAS cooling holes disposed therein.

Reference will now be made to the drawings wherein like reference numerals identify similar structural features or aspects of the subject disclosure. For purposes of explanation and illustration, and not limitation, an illustrative view of an embodiment of a blade outer air seal (BOAS) in accordance with the disclosure is shown in FIG. 2 and is designated generally by reference character 100. Other embodiments and/or aspects of this disclosure are shown in FIGS. 1, 3, and 4. The systems and methods described herein can be used to provide enhanced cooling for BOAS.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 100 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan gear system 100 may be varied. For example, gear system 100 may be located aft of combustor section 26 or even aft of turbine section 28, and fan section 22 may be positioned forward or aft of the location of gear system 100.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Referring to FIG. 2, in accordance with an embodiment of this disclosure, a blade outer air seal (BOAS) 100 is shown. Leakage of flow-path air may occur in turbomachinery between the tips of a rotating blade structure and the outer static structure. The BOAS 100 can be used to provide a sealing relationship between a rotating turbomachine blade (e.g., a turbine blade) and a stationary component of a turbomachine to prevent flow from leaking around a tip of the turbomachine blade. The BOAS 100 can include cooling holes 101 having locations substantially as defined in the Cartesian coordinates of Table 1, produced below. All locations are provided with respect to a point P which is at the center of arc W (e.g., having a radius ranging from about 10.16 inches (258.06 millimeters) to about 10.18 inches (258.57 millimeters)) and co-planer with machined surface V. Z originates at point P and bisects arc W. Y is perpendicular to surface V and X is orthogonal to Y and Z.

The locations are presented in Table 1 in cold, coated, and stationary condition and are subject to change based on finishing of the BOAS 100. Dimensions are presented in millimeters. One having ordinary skill in the art will appreciate that new locations of cooling holes 101 relative to any suitable reference can be determined in any suitable manner based on the procedures involved in finishing the BOAS 100. Holes are located within a true position of about 0.58 millimeters (about 0.023 inches). As described herein, holes 101 can include any suitable cross-sectional shape, such as, but not limited to, circular, elliptical, and/or any other symmetric or non-symmetric shape.

TABLE 1

| Hole | X | Y | Z |
|---|---|---|---|
| 1 | −27.04 | −3.53 | 240.73 |
| 2 | −20.93 | −3.51 | 241.34 |
| 3 | −15.53 | −3.51 | 241.75 |
| 4 | −10.11 | −3.51 | 242.03 |
| 5 | −4.70 | −3.51 | 242.20 |
| 6 | 0.72 | −3.51 | 242.24 |
| 7 | 6.14 | −3.51 | 242.17 |
| 8 | 11.56 | −3.51 | 241.97 |
| 9 | 16.97 | −3.51 | 241.65 |
| 10 | 22.37 | −3.51 | 241.21 |
| 11 | 27.76 | −3.51 | 240.65 |
| 12 | −28.07 | −9.81 | 240.58 |
| 13 | −23.17 | −10.17 | 241.10 |
| 14 | −17.19 | −9.13 | 241.60 |
| 15 | −12.25 | −9.13 | 241.90 |
| 16 | −7.31 | −9.13 | 242.10 |
| 17 | −2.37 | −9.13 | 242.20 |
| 18 | 2.58 | −9.13 | 242.20 |
| 19 | 7.53 | −9.13 | 242.10 |
| 20 | 12.47 | −9.13 | 241.89 |
| 21 | 17.40 | −9.13 | 241.59 |
| 22 | 22.33 | −9.13 | 241.18 |
| 23 | 27.25 | −9.13 | 240.68 |
| 24 | −27.61 | −16.84 | 240.64 |
| 25 | −21.61 | −17.15 | 241.25 |
| 26 | −15.43 | −16.33 | 241.72 |
| 27 | −10.02 | −16.33 | 242.01 |
| 28 | −4.60 | −16.33 | 242.17 |
| 29 | 0.82 | −16.33 | 242.21 |
| 30 | 6.24 | −16.33 | 242.13 |
| 31 | 11.66 | −16.33 | 241.93 |
| 32 | 17.06 | −16.33 | 241.61 |
| 33 | 22.47 | −16.33 | 241.17 |
| 34 | 27.86 | −16.33 | 240.61 |
| 35 | −29.24 | −5.79 | 243.95 |
| 36 | −29.24 | −9.30 | 243.95 |
| 37 | −29.24 | −12.80 | 243.95 |
| 38 | −29.28 | −16.18 | 243.94 |

TABLE 1-continued

| Hole | X | Y | Z |
|---|---|---|---|
| 39 | −29.24 | −21.74 | 243.95 |
| 40 | −29.24 | −26.87 | 243.95 |
| 41 | −29.24 | −32.00 | 243.95 |
| 42 | −29.24 | −35.54 | 243.95 |
| 43 | 29.24 | −34.52 | 243.95 |
| 44 | 29.24 | −29.39 | 243.95 |
| 45 | 29.24 | −24.26 | 243.95 |
| 46 | 29.24 | −19.13 | 243.95 |
| 47 | 29.24 | −14.55 | 243.95 |
| 48 | 29.24 | −11.05 | 243.95 |
| 49 | 29.24 | −7.09 | 243.95 |
| 50 | −28.09 | −19.52 | 240.58 |
| 51 | −24.41 | −19.64 | 240.98 |
| 52 | 27.86 | −18.46 | 240.61 |
| 53 | −29.12 | −14.27 | 242.94 |
| 54 | −29.12 | −17.94 | 242.95 |
| 55 | −29.12 | −19.80 | 242.94 |
| 56 | −29.12 | −24.05 | 242.94 |
| 57 | 29.12 | −21.59 | 242.94 |
| 58 | 29.12 | −16.63 | 242.95 |

In accordance with another embodiment of this disclosure, referring to FIG. 3, a BOAS 200 can include cooling holes 201 having locations substantially as described in the Cartesian coordinates of Table 2, produced below. All locations provided are with respect to point P' which is at the center of machined arc W' (e.g., having a radius ranging from about 10.25 inches (260.35 millimeters) to about 10.27 inches (260.86 millimeters)) and co-planer with interrupted surface V'. Z' originates at point P' and bisects arc W'. X' is perpendicular to surface V' and Y' is orthogonal to X' and Z'.

The locations are presented in Table 2 in cold, coated, and stationary condition and are subject to change based on finishing of the BOAS 200. Dimensions are presented in millimeters. One having ordinary skill in the art will appreciate that new locations of cooling holes 201 relative to any suitable reference can be determined in any suitable manner based on the procedures involved in finishing the BOAS 200. Holes 201 are located within a true position of about 0.58 millimeters (about 0.023 inches). As described herein, holes 201 can include any suitable cross-sectional shape, such as, but not limited to, circular, elliptical, and/or any other symmetric or non-symmetric shape.

TABLE 2

| Hole | X | Y | Z |
|---|---|---|---|
| 1 | 31.50 | −27.82 | 247.56 |
| 2 | 31.50 | −25.05 | 247.86 |
| 3 | 31.50 | −18.80 | 248.41 |
| 4 | 31.50 | −12.54 | 248.81 |
| 5 | 31.50 | −6.27 | 249.04 |
| 6 | 31.50 | 0.00 | 249.12 |
| 7 | 31.50 | 6.27 | 249.04 |
| 8 | 31.50 | 12.54 | 248.81 |
| 9 | 31.50 | 18.80 | 248.41 |
| 10 | 31.50 | 25.05 | 247.86 |
| 11 | 31.50 | 27.82 | 247.56 |
| 12 | 27.05 | 29.55 | 247.36 |
| 13 | 20.65 | 29.55 | 247.36 |
| 14 | 14.25 | 29.55 | 247.36 |
| 15 | 0.00 | 26.90 | 247.67 |
| 16 | 0.00 | 8.98 | 248.96 |
| 17 | 0.00 | −8.98 | 248.96 |
| 18 | 0.00 | −26.90 | 247.67 |
| 19 | 11.05 | −29.55 | 247.36 |
| 20 | 17.45 | −29.55 | 247.36 |
| 21 | 23.85 | −29.55 | 247.36 |

Referring to FIG. 4, a turbomachine can include a turbine section 300 including a plurality of blade outer air seals (BOAS) 100 and/or 200 as described above including cooling holes 101 and/or 201 having locations as set forth in Table 1 and/or Table 2. In certain embodiments, the turbine section 300 can include at least one BOAS 100 having cooling holes defined in accordance with Table 1 and at least one BOAS 200 having cooling holes defined in at accordance with Table 2. In certain embodiments, the at least one BOAS 100 having cooling holes 101 defined in at accordance with Table 1 can be disposed in a first stage 301 of the turbine section 300. The at least one BOAS 200 having cooling holes 201 defined in at accordance with Table 2 can be disposed in a second stage 303 of the turbine section 300 which is aft of the first stage 301.

Substantial conformance is based on points representing the cooling hole locations, for example in millimeters, as determined by selecting particular values of the scaling parameters. A substantially conforming BOAS structure has cooling holes that conform to the specified sets of points, within a specified tolerance of true position as described above.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure is sufficiently the same with respect to a part design in a type-certified or type-certificated BOAS, such that the part or structure complies with airworthiness standards applicable to the specified blade, vane or airfoil. In particular, substantial conformance encompasses any regulatory determination that a particular part or structure is sufficiently similar to, identical to, or the same as a specified BOAS, such that certification or authorization for use is based at least in part on the determination of similarity.

The methods and systems of the present disclosure, as described above and shown in the drawings, provide for BOAS with superior properties including improved cooling compared to traditional BOAS. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A blade outer air seal (BOAS) for a turbomachine, comprising:
    a BOAS body including a plurality of cooling holes defined in substantial conformance with a set of Cartesian coordinates as set forth in Table 1, wherein the Cartesian coordinates are provided with respect to a point P which is at the center of an arc W and co-planer with a machined surface V, wherein a coordinate Z originates at point P and bisects arc W, wherein a coordinate Y is perpendicular to surface V, and wherein a coordinate X is orthogonal to Y and Z and wherein the arc W is representative of a circumferential arc of the blade outer air seal.

2. The BOAS of claim 1, wherein the arc W includes a radius ranging from about 10.16 inches (258.06 millimeters) to about 10.18 inches (258.57 millimeters).

3. A blade outer air seal (BOAS) for a turbomachine, comprising:
a BOAS body including a plurality of cooling holes defined in substantial conformance with a set of Cartesian coordinates as set forth in Table 2, wherein the Cartesian coordinates are provided with respect to a point P' which is at the center of an arc "W'" and co-planer with a machined surface V', wherein a coordinate Z' originates at point P' and bisects arc W', wherein a coordinate X' is perpendicular to surface V', and wherein a coordinate Y' is orthogonal to X' and Z' and wherein the arc W is representative of a circumferential arc of the blade outer air seal.

4. The BOAS of claim 3, wherein the arc W' includes ranging from about 10.25 inches (260.35 millimeters) to about 10.27 inches (260.86 millimeters).

5. A turbomachine, comprising: a turbine section including a plurality of blade outer air seals (BOAS) disposed therein, each of the plurality of BOASs including a BOAS body including a plurality of cooling holes defined in substantial conformance with a set of Cartesian coordinates as set forth in Table I or Table 2 and wherein the arc W is representative of a circumferential arc of the blade outer air seal.

6. The turbomachine of claim 5, wherein the plurality of BOASs includes at least one BOAS having cooling holes defined in at accordance with Table 1, and at least one BOAS having cooling holes defined in at accordance with Table 2.

7. The turbomachine of claim 6, wherein the at least one BOAS having cooling holes defined in at accordance with Table 1 is disposed in a first stage of the turbine section.

8. The turbomachine of claim 7, wherein the at least one BOAS having cooling holes defined in at accordance with Table 2 is disposed in a second stage of the turbine section aft of the first stage.

* * * * *